Figure 1:
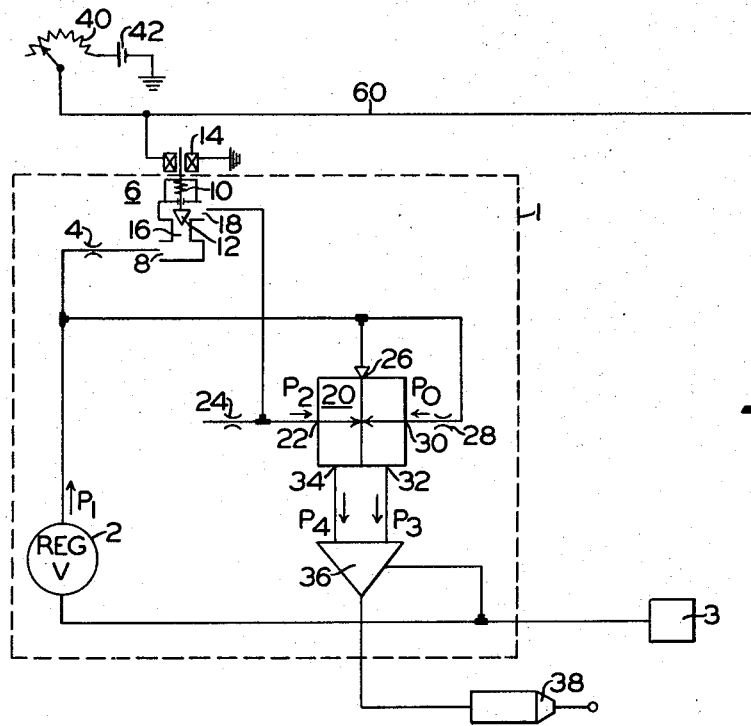

United States Patent [19]
Nagase

[11] 3,717,165
[45] Feb. 20, 1973

[54] CONTROL SYSTEM FOR FLUID PRESSURE BRAKE APPARATUS

[75] Inventor: Minoru Nagase, Kobe, Japan

[73] Assignee: The Nippon Air Brake Co., Ltd., Kobe, Japan

[22] Filed: March 22, 1971

[21] Appl. No.: 126,854

[30] Foreign Application Priority Data

March 23, 1970 Japan..................45/24340

[52] U.S. Cl................................137/81.5
[51] Int. Cl.................................F15c 3/00
[58] Field of Search.......................137/81.5

[56] References Cited

UNITED STATES PATENTS

| | | | |
|---|---|---|---|
| 3,575,209 | 4/1971 | Kast | 137/81.5 |
| 3,499,599 | 3/1970 | Meininger et al. | 137/81.5 X |
| 3,494,357 | 2/1970 | Kimball | 137/81.5 X |
| 3,508,565 | 4/1970 | Strantz | 137/81.5 |
| 3,536,086 | 10/1970 | Brown | 137/81.5 |
| 3,564,373 | 2/1971 | Carpenter | 137/81.5 |
| 3,581,754 | 6/1971 | Adams | 137/81.5 |
| 3,590,843 | 7/1971 | Meyer | 137/81.5 |
| 3,595,259 | 7/1971 | Adams | 137/81.5 |
| 3,596,742 | 8/1971 | Zierak | 137/81.5 X |
| 3,613,369 | 10/1971 | Colston | 137/81.5 X |

*Primary Examiner*—Samuel Scott
*Attorney*—Ralph W. McIntire, Jr.

[57] ABSTRACT

A control system is provided for controlling high fluid operating pressure by utilizing a low fluid pressure control circuit embodying an electro/fluidic convertor which generates a low pressure control signal corresponding to an electrical input and a pure fluid proportional amplifier responsive to the control signal generated for driving a fluidic/pneumatic relay, the high pressure output of which is proportional to the electrical input. The system may also include additional valve means for further adjusting the low pressure control signal in accordance with some variable function by which the high pressure output is to be regulated.

9 Claims, 2 Drawing Figures

INVENTOR.
MINORU NAGASE
BY Ralph W. McIntire, Jr.
ATTORNEY

CONTROL SYSTEM FOR FLUID PRESSURE BRAKE APPARATUS

BACKGROUND OF THE INVENTION

High fluid pressure operating systems, such as railroad vehicle brake control systems, which are controlled directly, i. e., by the high fluid pressure itself, require relatively large operating devices, which in turn require relatively high forces to actuate. In overcoming the inertia of moving parts in these large devices, system response is adversely affected, thereby imposing a limiting factor upon the attainment of higher train operating speeds envisioned as necessary to assure the viability of railroads in the future. Also, the high actuating force requirements predispose such systems to consume large amounts of electrical power where the actuating forces are provided by electro-magnetic means. In very sensitive systems, the non-linearity attributed to the flow of high fluid pressure through control orifices is critical. Finally, in order to prevent high fluid pressure leakage, expensive sealing materials must be utilized with careful maintenance and periodic inspection periods being required.

SUMMARY OF THE INVENTION

It is, therefore, the object of the present invention to provide a low fluid pressure control circuit for control of high fluid pressure operated systems which will avoid the above-mentioned difficulties attributed to control of such systems by the use of high fluid pressure directly.

According to the present invention, an electro/fluidic convertor in the form of a fluid flow control valve having a solenoid operator is provided to vary its output in proportion to the degree of energization of the solenoid operator to provide a low fluid pressure control signal. A pure fluid proportional amplifier element is responsive to the low fluid pressure control signal to provide a proportional differential output which reflects the gain of the amplifier and is utilized to drive a conventional relay valve device for supplying a high capacity system requirement, such as a railway vehicle brake system, with high fluid operating pressure corresponding to an electrical input which provides energization of the solenoid operator controlling the electro/fluidic convertor.

In a second embodiment, a fluid pressure operated flow control valve is provided to modify the low fluid pressure control signal connected to the proportional amplifier element in accordance with vehicle air spring pressure to thereby regulate the control signal and, consequently, adjust the brake system pressure according to vehicle load conditions.

Figure 2:
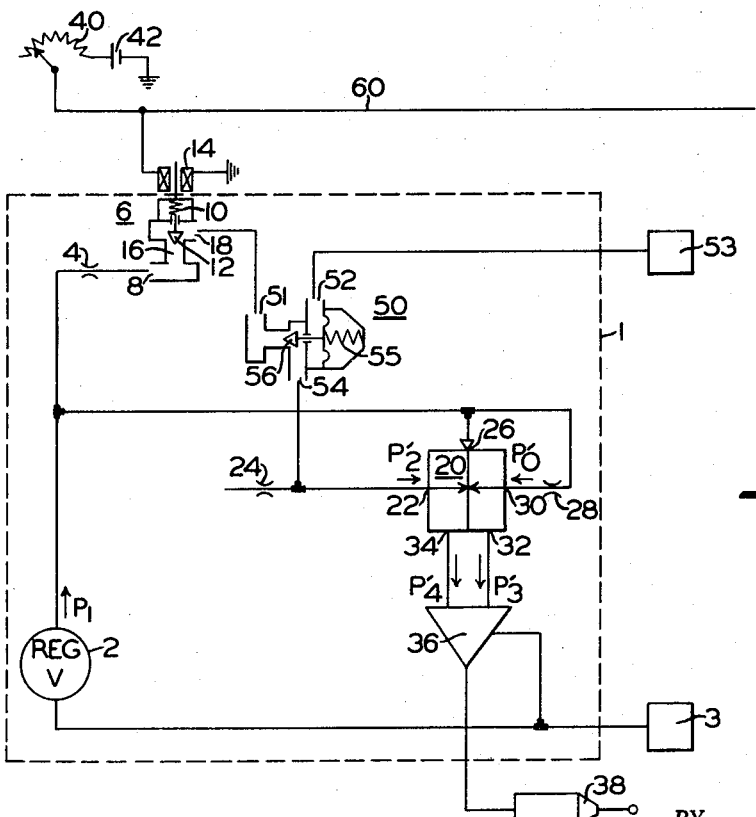

Other objects and features of the invention will be more readily apparent from the following more detailed description when considered with the accompanying drawings in which:

FIG. 1 is a schematic of the low fluid pressure control circuit of the invention as utilized between an electrical input control device and a high fluid pressure actuating device; and FIG. 2 is a schematic of a low fluid pressure control circuit as in FIG. 1, but modified to include an additional input control device in series with the electrical input device of FIG. 1.

Referring to FIG. 1 of the drawings, each car of a train may be provided with a low fluid pressure control system, as shown within the broken lines 1, including a regulating valve device 2 which is adapted to convert high fluid pressure from a regulated source 3 to a constant low fluid pressure level, indicated as $P_1$.

A fluid pressure restrictor 4 is provided to adjust the low constant pressure $P_1$ supplied by regulating valve 2 to a correspondingly desired lower value for connection to the inlet 8 of a low pressure flow control valve device 6. Comprising flow control valve device 6 is a spring 10 and a throttle valve 12 which is biased by spring 10 toward a seated position in opposition to the action of an electro-coil 14, which is effective to control the position of valve 12 and thereby vary the flow capacity of a passage 16 in accordance with the amount of current passing through coil 14.

An outlet 18 of flow control valve 6 is connected to a control input 22 of a pure fluid proportional amplifier element 20. Input 22 is communicated to atmosphere via a fluid flow restrictor 24. Proportional amplifier 20 is further provided with a power port 26 and an opposing control port 30 having a fluid flow restrictor 28. Ports 26 and 30 are each communicated with fluid pressure provided by regulating valve 2. This low pressure air supply at power port 26 is divided into two flow paths provided by outputs 32 and 34 of amplifier 20, the degree of pressure established in the respective outputs depending upon the pressure differential between control ports 22 and 30 consistent with operation of conventional proportional amplifiers of the pure fluid type. The above-mentioned restrictor 24 is used to adjust the bleed of air from outlet 18 of valve 6 to atmosphere and thereby adjust the value of pressure $P_2$ developed at input 22 of amplifier 20, as desired. Similarly, restrictor 28 may be adjusted to establish pressure $P_0$ at input 30 for biasing amplifier 20 in opposition to pressure which may be effective at control port 22 due to leakage of fluid pressure past throttle valve 12 when coil 14 is deenergized.

The pressure differential between outputs 32 and 34 of amplifier 20, as indicated by symbols $P_3$ and $P_4$ respectively, is fed to a fluidic/pneumatic relay valve 36 which provides a high fluid pressure output proportional to the effective pressure differential. Relay valve 36 may be of a conventional self-lapping type commonly used in railway brake control systems and is arranged in the present system to connect high fluid pressure from source 3 to a vehicle brake cylinder device 38, in accordance with the pressure difference formed between amplifier outputs 32 and 34, to effect a brake application on the vehicle.

The winding of electro-coil 14 is arranged in a circuit including a rheostat 40 and a battery 42. A line conductor 60 is passed through additional cars in the train to carry battery supply to similar coils on each car for controlling, in a similar fashion, the control circuit within broken lines 1 in accordance with operation of rheostat 40, to thereby effect brake control of each car of a train as hereinafter explained.

Assuming now that bias pressure $P_0$ at port 30 of the proportional amplifier 20 is adjusted to balance any pressure $P_2$ effective at port 22, which may exist in the closed condition of throttle valve 12 due to leakage, pressure at the proportional amplifier outputs 32 and 34 is maintained substantially equal. In the absence of any differential between the amplifier outputs, relay valve 36 is effective to completely release brake cylinder pressure. Consequently, the train brakes are released when the current to electro-coils 14, as controlled by rheostat 40, is insufficient to open throttle valve 12 of the flow control valve 6 on the car or cars comprising the train.

If a brake application is desired, rheostat 40 is operated to reduce the resistance to current flow via coils 14. Throttle valve 12 is accordingly opened against the resistance of spring 10 an amount corresponding to the degree of energization of coil 14 to control the flow of fluid pressure flowing via passage 16 to outlet 18, thus controlling the fluid pressure signal $P_2$ at control port 22 of proportional amplifier 20. Since bias pressure $P_o$ at port 30 remains constant, the power stream is diverted by an increase in pressure effective at port 22 to produce a differential pressure $P_3$ and $P_4$ corresponding to the differential between pressures $P_2$ and $P_o$. The desired gain of the amplifier is assured by the fact that the pressure $P_1$ effective at the power port 26 is greater than the range of pressures $P_2$ controlled by flow control valve 6, due to the pressure dropping restrictor 4.

Relay valve 36 will operate to provide high output pressure in proportion to the pressure difference between proportional amplifier outputs $P_3$ and $P_4$, from which the relay valve 36 is controlled. In this way, the high pressure air supplied to brake cylinder 38 by source 3 is controlled in accordance with the degree of energization of coil 14 to establish a brake application on each car corresponding to operation of rheostat 40.

As mentioned above, the brake control device described in this invention utilizes low pressure fluid to control the brake actuating pressure. Therefore, the actuating force or the strength of the electro device required to vary the low control pressure can be smaller than required by a corresponding device controlling high pressure fluid; the device itself can therefore be smaller and more easily installed. The use of low pressure fluid results in better actuation response, less frictional loss and easier maintenance.

In another embodiment of the invention, as shown in FIG. 2, the brake control device, as above described, is expanded to include a variable load adjustment feature. Wherever applicable, corresponding reference numerals are used for like elements.

A flow control valve 50 is provided having a passage in which the flow of fluid pressure is varied in proportion to an air pressure signal. Valve 50 is provided with an inlet 51 connected to the discharge opening 18 of the low pressure fluid flow control valve 6 and a connection 52 subject to fluid pressure of the air spring system 53, which pressure is proportional to the vehicle load. A discharge opening 54 is connected to input 22 of proportional amplifier element 20. Contained within control valve 50 is a diaphragm piston operated throttle valve 56 biased toward a seated position by the action of a spring 55, and opened in response to air spring pressure acting in opposition to spring 55.

Since the air spring system 53 supplies air pressure to control valve 50 in proportion to the load of a vehicle and since valve 56 opens or closes in proportion to this supplied air pressure, the control air pressure $P'_2$ supplied to input 22 of the proportional amplifier element 20 will be further adjusted in proportion to vehicle load. It is assumed that the bias air pressure supplied to bias input 30 of the proportional amplifier element 20 is $P'_o$, and the two output pressures supplied to the control valve 36 are $P'_3$ and $P'_4$. The device is so constructed that the pressure difference between $P'_2$ and $P'_o$ should be proportional to that between $P'_3$ and $P'_4$. The pressure differential between the two output air pressures $P'_3$ and $P'_4$ operates valve 36 to provide control of the high pressure air supplied from the source of high pressure air supply 3 to the brake cylinders in proportion to the vehicle load.

The bias air pressure $P'_o$ of the proportional amplification element 20 has been adjusted to be equal to the initial value of the air pressure $P'_2$ mentioned above, that is, equal to the air pressure $P'_2$ in the absence of brake control.

As described above, the embodiment of FIG. 2 is equipped with a flow control valve which operates to vary control pressure in proportion to air spring pressure, consequently varying electro/pneumatic brake control in accordance with the vehicle load.

Having now described the invention, what I claim as new and desire to secure by Letters Patent, is:

1. A system providing control of high operating pressure comprising:
    a. a first source of fluid pressure of a predetermined magnitude,
    b. a pure fluid proportional amplifier having a supply port communicated with said first source of fluid pressure to provide a power stream, a first input subject to a control signal for controlling said power stream and a pair of outputs pressurized by said power stream in accordance with said control signal to thereby provide an output signal,
    c. a conduit communicating said first source of fluid pressure with said first input of said amplifier said conduit having a branch in which is disposed flow restrictor means to reduce the magnitude of said first source of fluid pressure,
    d. first flow control valve means disposed in said branch of said conduit downstream of said flow resistor means to vary the flow of fluid pressure therein responsive to a first input signal to thereby provide said control signal,
    e. a second fluid pressure source at a pressure greater than that of said first fluid pressure source, and
    f. relay valve means responsive to said output signal for varying the supply of fluid pressure from said second source to a fluid pressure responsive actuator device.

2. The system, as recited in claim 1, wherein said first flow control valve means is solenoid operated, said first input signal being provided by a rheostat operable to vary the resistance value of an electrical circuit via which current is supplied to said solenoid, 3. The system, as recited in claim 1, further comprising second flow control valve means interposed in said conduit between said first flow control valve means and said proportional amplifier, being operable in response to a second input signal to further vary the flow of fluid pressure in said branch conduit subsequent to variation by said first flow control valve means to thereby modify said control signal.

4. The system, as recited in claim 3, wherein said second flow control valve means is fluid pressure operated, being controlled in accordance with different conditions affecting variations of fluid pressure providing said second input signal.

5. The system, as recited in claim 1, wherein said proportional amplifier is provided with a second input having associated therewith fluid flow restrictor means, said second input being communicated with said first source of fluid pressure to provide a bias signal at said amplifier in opposition to said control signal.

6. The system, as recited in claim 5, wherein said pair of outputs of said proportional amplifier are pressurized in opposite sense in accordance with the differential between said control signal and said bias signal, the differential pressure between said outputs providing said output signal.

7. The system, as recited in claim 6, wherein said relay valve means is subject to the pressure differential between said pair of outputs.

8. The system, as recited in claim 1, wherein said first fluid pressure source is comprised of regulator valve means for providing a said first source of fluid pressure.

9. The system, as recited in claim 8, wherein said regulator valve means is supplied with fluid pressure provided by said second fluid pressure source.

* * * * *